United States Patent
Gurumoorthy et al.

(10) Patent No.: US 8,352,959 B2
(45) Date of Patent: Jan. 8, 2013

(54) APPARATUS, SYSTEM, AND METHOD FOR NON-INTRUSIVE MONITORING OF BUSINESS EVENTS

(75) Inventors: Rajesh Gurumoorthy, Burlingame, CA (US); Yury Kosov, San Francisco, CA (US); Juliana Hing Tsang, San Lorenzo, CA (US)

(73) Assignee: International Business Machines Corporation, Armonk, NY (US)

( * ) Notice: Subject to any disclaimer, the term of this patent is extended or adjusted under 35 U.S.C. 154(b) by 1664 days.

(21) Appl. No.: 11/378,077

(22) Filed: Mar. 17, 2006

(65) Prior Publication Data

US 2007/0240167 A1 Oct. 11, 2007

(51) Int. Cl.
*G06F 9/44* (2006.01)
*G06G 1/14* (2006.01)

(52) U.S. Cl. .......................................... 719/318; 705/22
(58) Field of Classification Search ................. 705/1, 22; 719/318
See application file for complete search history.

(56) References Cited

U.S. PATENT DOCUMENTS

| | | | |
|---|---|---|---|
| 2001/0028304 A1 | 10/2001 | I'anson et al. | 340/539 |
| 2002/0156761 A1* | 10/2002 | Chen et al. | 707/1 |
| 2002/0184043 A1* | 12/2002 | Lavorgna et al. | 705/1 |
| 2004/0139447 A1 | 7/2004 | Hope et al. | 719/318 |
| 2005/0060372 A1* | 3/2005 | DeBettencourt et al. | 709/206 |

* cited by examiner

*Primary Examiner* — Charles E Anya
(74) *Attorney, Agent, or Firm* — Kunzler Law Group, PC (57) ABSTRACT

An apparatus, system, and method are disclosed for the non-intrusive monitoring of business events on a middleware server. The steps to non-intrusively monitor business events on a middleware server include: monitoring business event traffic on a middleware server based on at least one business process probe that specifies an event and at least one business object attribute to be monitored; extracting data values associated with the specified attributes from the specified business event; storing the data values in a persistent data store; and present the data to the user. The monitoring does not alter the flow of existing business processes associated with the specified business event.

22 Claims, 5 Drawing Sheets

APPARATUS, SYSTEM, AND METHOD FOR NON-INTRUSIVE MONITORING OF BUSINESS EVENTS

BACKGROUND OF THE INVENTION

1. Field of the Invention

This invention relates to the monitoring of business events and more particularly relates to monitoring business events at the business process level.

2. Description of the Related Art

Application integration has emerged as a key e-business technology for providing integrated customer solutions arising from the need to share application data among multiple customer applications. For example, WebSphere Interchange Server from IBM of Armonk, N.Y., may be part of a WebSphere integration system that enables data flow between disparate data stores and applications. The exchange of data is typically bi-directional, metadata driven, and encapsulated in business events known as business objects. A business object typically includes a set of attributes that represent a business entity (such as Employee) and an action on the data (such as a create or update operation).

The component of a WebSphere business integration system that integrates data among heterogeneous applications is typically referred to as an integration broker or integration server. An integration server typically provides a variety of services that include the ability to route data, a repository of rules that govern the integration process, connectivity to a variety of applications, and administrative capabilities that facilitate integration.

WebSphere Interchange Server also enables users to create business processes using a process design tool. A business process defines how the business events that are passing through the system should be handled. A need exists for customers to be able to monitor the events that are passing through an Integration server without affecting the existing business process. Monitoring business events, including the data values for business objects associated with the business events permits early detection regarding proper operation of a business process without disrupting the flow of the business process. Conventional technology allows users to detect the number of business events passing through a particular integration server, but the data encapsulated within the business objects associated with the business events is unavailable for monitoring without disrupting the existing business process. Often a count of the number of events is not enough granularity for proper monitoring and evaluation.

From the foregoing discussion, it should be apparent that a need exists for an apparatus, system, and method that provides for the non-intrusive monitoring of business events on an integration server. Beneficially, such an apparatus, system, and method would allow data encapsulated with the business events to be monitored and stored without affecting the existing business process such that a user could more efficiently monitor and manage the business events.

SUMMARY OF THE INVENTION

The present invention has been developed in response to the present state of the art, and in particular, in response to the problems and needs in the art that have not yet been fully solved by currently available business event monitoring systems. Accordingly, the present invention has been developed to provide a computer programmed product and method for non-intrusively monitoring business events that overcome many or all of the above-discussed shortcomings in the art.

A computer programmed product is provided with modules to functionally execute the necessary steps of non-intrusively monitoring business events. These modules in the described embodiments include a monitor module, extraction module, and capture module.

The monitor module, in one embodiment, is configured to monitor business event traffic on a middleware server based on at least one business process probe comprising a business event and at least one business object attribute. The monitor module may be further configured to detect the business event specified by the business process probe in the business event traffic without altering the flow of an existing business process associated with the business event. The business object attribute may comprise a subset of business object attributes associated with the business event. In one embodiment, the middleware server may be an integration server.

The extraction module, in one embodiment, is configured to extract data values associated with the business object attributes from an occurrence of the specified business event. The data extracted corresponds to business object attributes defined by a user in defining the business process probe.

The capture module, in one embodiment, is configured to store the data values in a persistent data store without altering the flow of an existing business process associated with the business event.

The computer programmed product may further include the logic necessary for presenting the data associated with the business object attributes to a user. In one embodiment, a report may be generated comprising data stored in the data store. Furthermore, the computer programmed product may include the logic necessary to filter the data in the data store according to user specified criteria. In one embodiment, the computer programmed product may also include logic necessary to query the data stored in the data store according to user specified criteria. The computer programmed product may further include the logic necessary to alert a user in response to the stored data satisfying a predetermined condition.

In one embodiment, the computer programmed product includes the logic necessary to specify at least one location within a business scenario where the business event traffic is monitored. The computer programmed product may further include the logic necessary to crate a collaboration template having a business process probe positioned within a business scenario of the collaboration template such that the business process probe comprises a business event and at least one business object attribute. Furthermore, the collaboration template may be compiled to create a collaboration object. In one embodiment, the collaboration object is deployed to the middleware server and substantially includes the modules and logic described above.

A method of the present invention is also presented for non-intrusively monitoring business events. The method in the disclosed embodiments substantially includes the steps necessary to carry out the functions presented above with respect to the operation of the described computer programmed product. In one embodiment, the method includes defining a business process probe that identifies a probe point within a business process scenario such that the business process probe includes a business event and at least one business object attribute. The method also may include executing a business process monitoring utility substantially comprising the modules and logic described above including a monitor module to monitor business event traffic on a middleware server for an occurrence of the business event; an extraction module to extract data values associated with the business object attributes from the occurrence of the business event; and a capture module to store the data values in a persistent data store. In a further embodiment, the method includes making the captured data accessible to a customer.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer programmed product may take any form capable of generating a signal, causing a signal to be generated, or causing execution of a program of machine-readable instructions on a digital processing apparatus. A computer programmed product may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
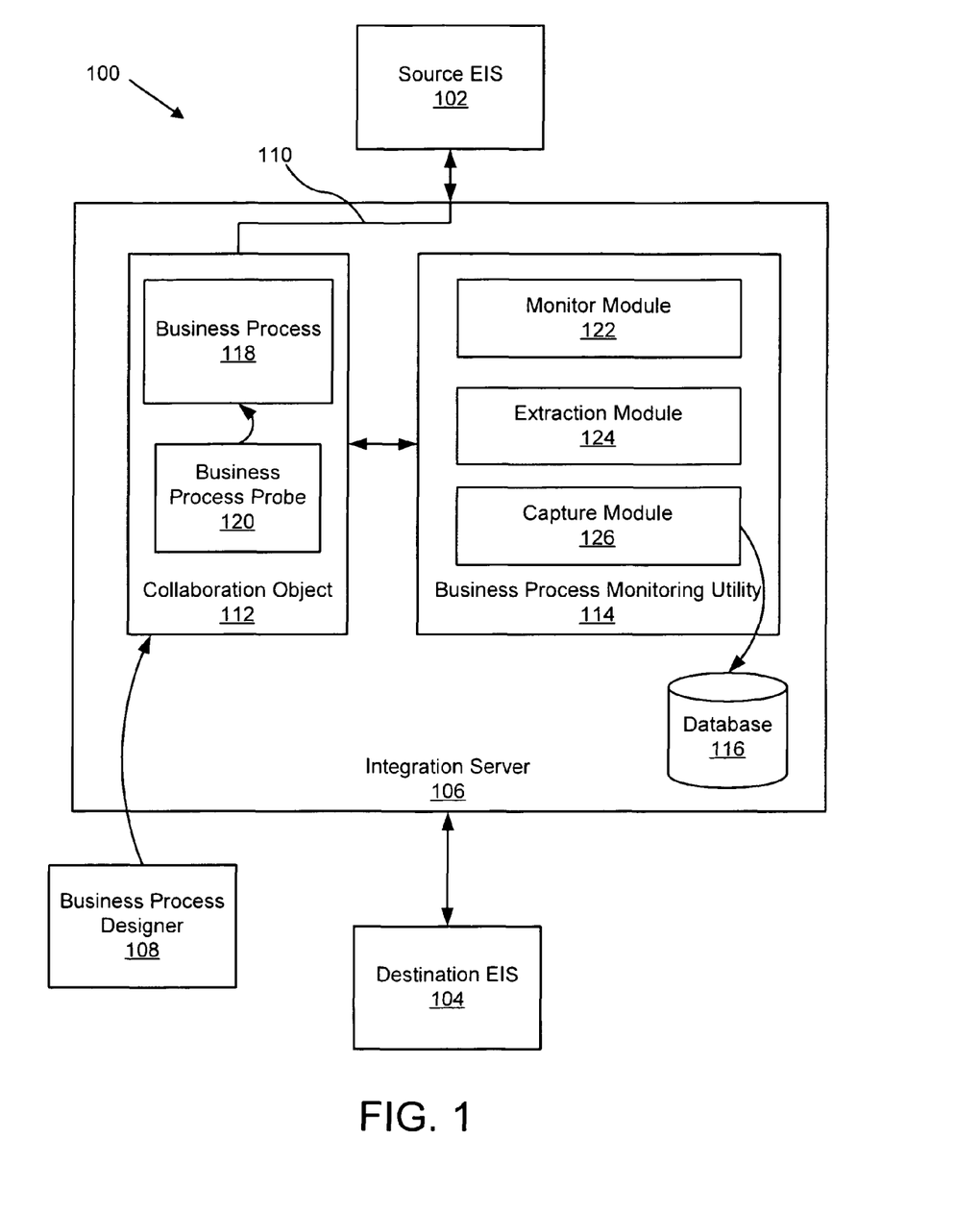
FIG. 1 is a schematic block diagram depicting one embodiment of an integration system for non-intrusively monitoring business events in accordance with the present invention.

FIG. 1 is a schematic block diagram depicting one embodiment of an integration system 100 for non-intrusively monitoring business events in accordance with the present invention. The system 100 includes a source enterprise information system (EIS) 102 connected to a destination EIS 104 via an integration server 106. In one embodiment, the system may also include a business process designer 108.

The source EIS 102 sends data to the integration server 106 such that the data may be shared with other applications or EIS' such as destination EIS 104. For example, a change to an application entity within the source EIS 102 may trigger the creation of a business object 110 for delivery to the destination EIS 104. A business object 110 typically includes a set of attributes that represent a business entity (such as Employee) and an action on the data (such as a create or update operation). Business objects are generally used to exchange information and trigger actions between disparate applications. The business object 110 or business event 110 is passed to the integration server 106 along with other business event traffic.

The integration server 106 receives the business event 110 and processes the business event 110 to coordinate the data exchange between the source EIS 102 and the destination EIS 104. In one embodiment, the integration server 106 includes a collaboration object 112, a business process monitoring utility 114, and a database 116.

The collaboration object 112 is an object that is executable on the integration server 106 and is configured for a specific business environment to integrate specific applications or software products used by the EIS' 102 and 104. In one embodiment, the collaboration object 112 defines a business process 118 for processing incoming business events 110. Typically, a business process 118 defines operations and relationships between different business activities. For example, a business process 118 may coordinate the sequence of processing from one business activity to another, or a business process 118 may specify the information required as inputs for certain business activities. Furthermore, a business process 118 may comprise a compilation of several smaller business processes 118 or sub-processes that combine to form a larger end-to-end business process 118.

The collaboration object 112, in one embodiment, may also define a business process probe 120. A business process probe 120 typically specifies a business event 110 and at least one business object attribute. In one embodiment, the business process probe 120 indicates to the business process monitoring utility 114 which business events 110 are to be monitored by the business process monitoring utility 114, and the location within the business process 118 at which the monitoring occurs. The business object attributes included with a business process probe 118 indicate to the business process monitoring utility 114 the data from within each specified business event 110 that is to be processed by the business process monitoring utility 114.

The business process monitoring utility 114, in one embodiment, includes a monitor module 122, an extraction module 124, and a capture module 126. The modules typically include the logic necessary to perform the processing operations for monitoring business event traffic on the integration server 106.

The monitor module 122 may be configured to monitor business event traffic on a middleware server, such as integration server 106, based on at least one business process probe 120 comprising a specified business event 110 and at least one business object attribute as described above. The monitor module 122 also detects the business event 110 from within the business event traffic as specified by the business process probe 120 without altering the flow of the existing business process 118.

The extraction module 124, in one embodiment, is configured to extract data values from the business events 110 as specified by the business process probe 120. For example, the business process probe 120 may indicate that the monitor module 122 should monitor and detect business events 110 called "bus_obj_employee" which represent current employees of a company. The business process probe 120 may also indicate that extraction module 124 should extract data from within the business events 110 corresponding to the first and last names of the employees. In this case, each time a business event 110 passes through the business process 118, extraction module 124 may extract data corresponding to the attributes "bus_obj_employee.first_name" and bus_obj_employee.last_name" from the business events 110. Doing so would not effect the processing of the associated business events 110.

The capture module 126, in one embodiment, stores the extracted data in a persistent data store such as database 116. The data may also be presented to a user for real time viewing, or in another embodiment a report may be generated to present the data to a user in table or graphical form as will be recognized by one skilled in the art.

Furthermore, the business process monitoring utility 114 may filter the data stored in the database 116 according to user specified criteria. In one embodiment, the business process monitoring utility may also query the data stored in the database 116 according to user specified criteria such that the data may more efficiently be presented to a user. In a further embodiment, the business process monitoring utility 114 may alert a user in response to the stored data satisfying a predetermined condition. For example, the monitor module 122 may monitor the number of orders a business receives from a particular region of the country. In response to the number of orders reaching some threshold, a user would be notified. This may be useful if the user needs to inform the shipping department to prepare for a large number of shipments to the selected region of the country.

The integration server 106 passes the business events 110 to the destination EIS 104 as dictated by business process 118. The business event 110 is processed the same within the business process 118 whether or not data is extracted form the business event 110 and processed by the business process monitoring utility 114.

The business process designer 108, in one embodiment, is a utility that enables a user to create and implement the collaboration object 112. The business process designer 108 may create a collaboration template having a business process probe 120 positioned within a business scenario (see FIG. 4) of the collaboration template. A collaboration template includes the logic and framework of a business process and provides the definition of its actions. A collaboration template typically consists of code such as Java, which the business process designer 108 generates. The collaboration template may include a business scenario that specifies a particular set of actions representing the business process 118. The positioning of the business process probe 120 within the business scenario of the collaboration template indicates at which point in the business process 118 that monitoring will occur.

The business process designer 108 also compiles the collaboration template to create the collaboration object 112 which is executable on the integration server 106. In one embodiment, the collaboration object is deployed to the integration server 118 such that the business process probe 120 prompts the business process monitoring utility 114 to monitor the corresponding business events 110.

Figure 2:
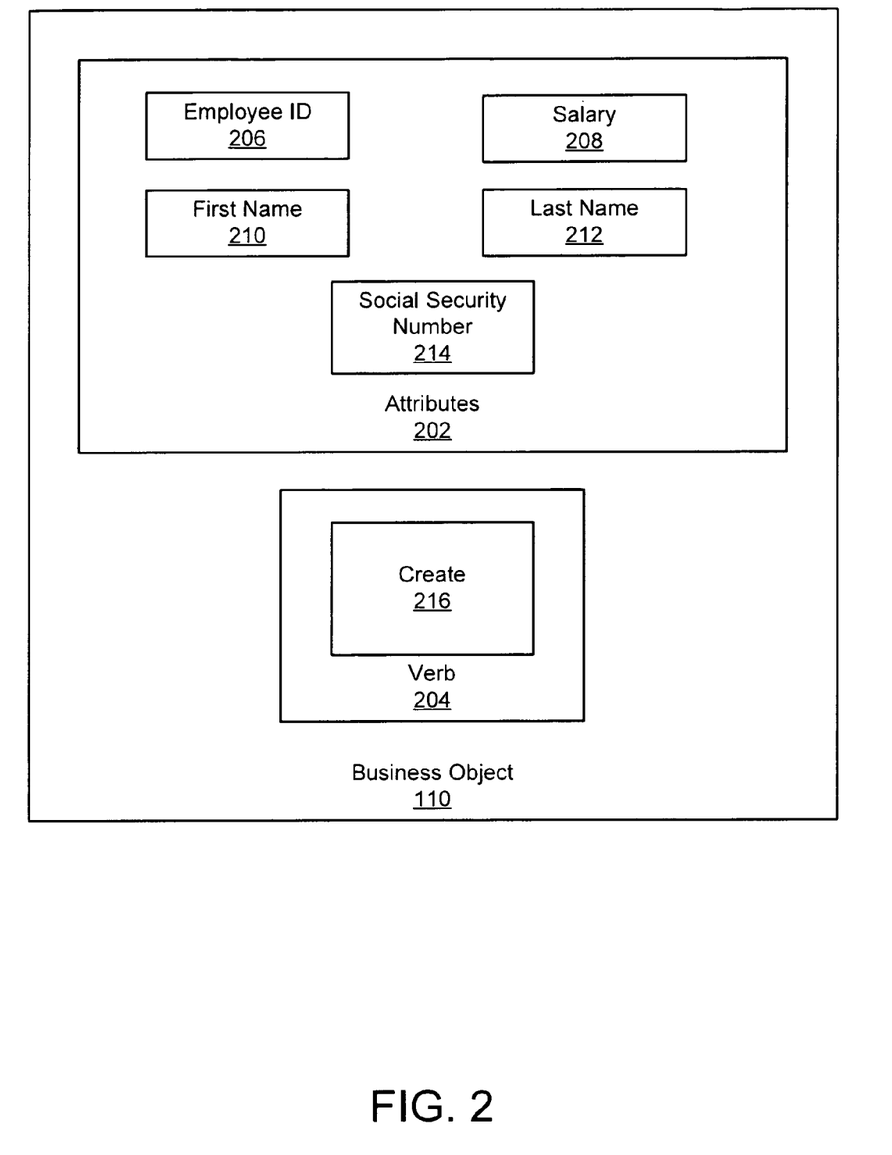
FIG. 2 is a schematic block diagram depicting one embodiment of a business object for use in accordance with the present invention.

FIG. 2 is a schematic block diagram depicting one embodiment of a business object 110 for use in accordance with the present invention. A business object 110 is a piece of information or data that is relevant to a business and that needs to be stored and used across multiple business transactions. Typically, a business object 110 includes a set of attributes 202 and an action or verb 204. A business object 110 is useful because it can be transferred via an integration server 106 from one application to another or from one user to another during the course of a business process 118, and multiple applications 102 and 104 can make use of the same business object 110 for different purposes.

In one embodiment, a business object 110 represents a business event such as the creation of a new employee. In this case, attributes 202 may include employee ID 206, Salary 208, First Name 210, Last Name 212, and Social Security Number 214. The verb 204 in this case may be Create 216. By way of example, this new employee may be created by one department of a company such as Human Resources. However, each department within the company may need to represent the new employee in their information system. In this example, the Human Resources department would enter the employee's information into their system which may cause a business object 110 to be created. The business object 110 then may be distributed via a business process 118 on the integration server 106 to the various departments in the company.

With regard to the present invention, the business process probe 120 may indicate that the business process monitoring utility 114 should monitor all business events 110 corresponding to new employees. The business process probe 120 may also indicate that the extraction module 124 should extract the first name, last name, and salary associated with the new employee. In this instance, as the business object 110 passes through the business process 118, the data associated with attributes 202 First Name 210, Last Name 212, and Salary 208 would be extracted by the extraction module 124 and stored in a database 116 by capture module 126. The business object 110 is processed without regard to the monitoring and accordingly reaches the appropriate destination EIS 104.

Figure 3:
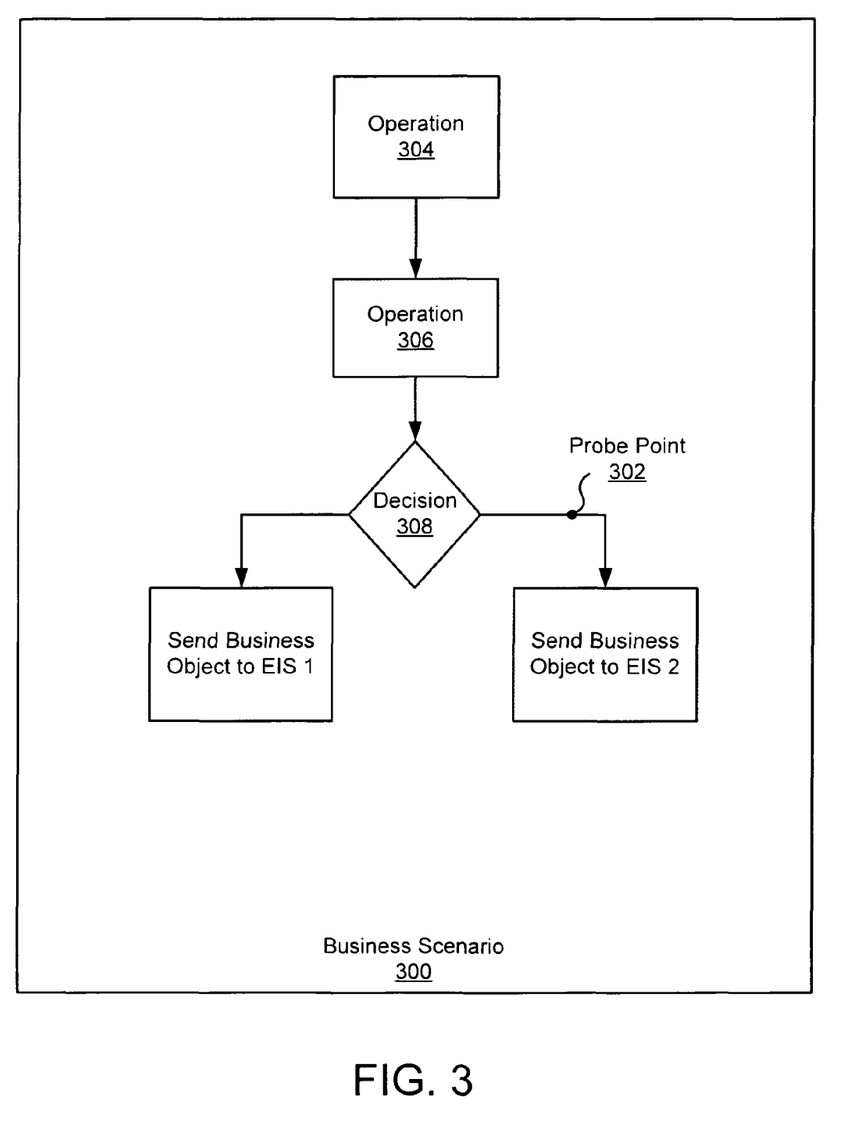
FIG. 3 is a schematic block diagram depicting one embodiment of a business scenario in accordance with the present invention.

FIG. 3 is a schematic block diagram depicting one embodiment of a business scenario 300 in accordance with the present invention. As described above, a business scenario 300 is a component of a collaboration template that handles a particular business object 110 or set of business objects 110 and defines how the business objects 110 will be processed. A business scenario 300 at the development level typically corresponds to a business process 118 or sub-process at the run-time level. Therefore, a business probe point 302 can be positioned within a business scenario 300 such that at runtime, the business process monitoring utility 114 may monitor business events 110 within the business event traffic at the location within the business process 118 that corresponds to the position of the probe point 302 within the business scenario 300. In one embodiment, the probe point 302 is part of a business process probe 120 that defines which business events 110 are monitored and which data within the business events 110 are to be captured.

As depicted, in one embodiment, the business scenario includes operation 304, operation 306, and decision 308. The decision 308 may split the business event traffic exiting operation 306 into two diverging flows of business event traffic. The probe point 302 may be placed at any location within the business scenario 300. Furthermore, more than one probe point 302 may be utilized simultaneously. Once the collaboration template is compiled into a collaboration object 112 and deployed to an integration server 106, the probe point 302 and other business process probe information 120 may be used by the business process monitoring utility 114 to monitor the flow of business events at the point in the business process 118 that corresponds to the probe point 302.

Figure 4:
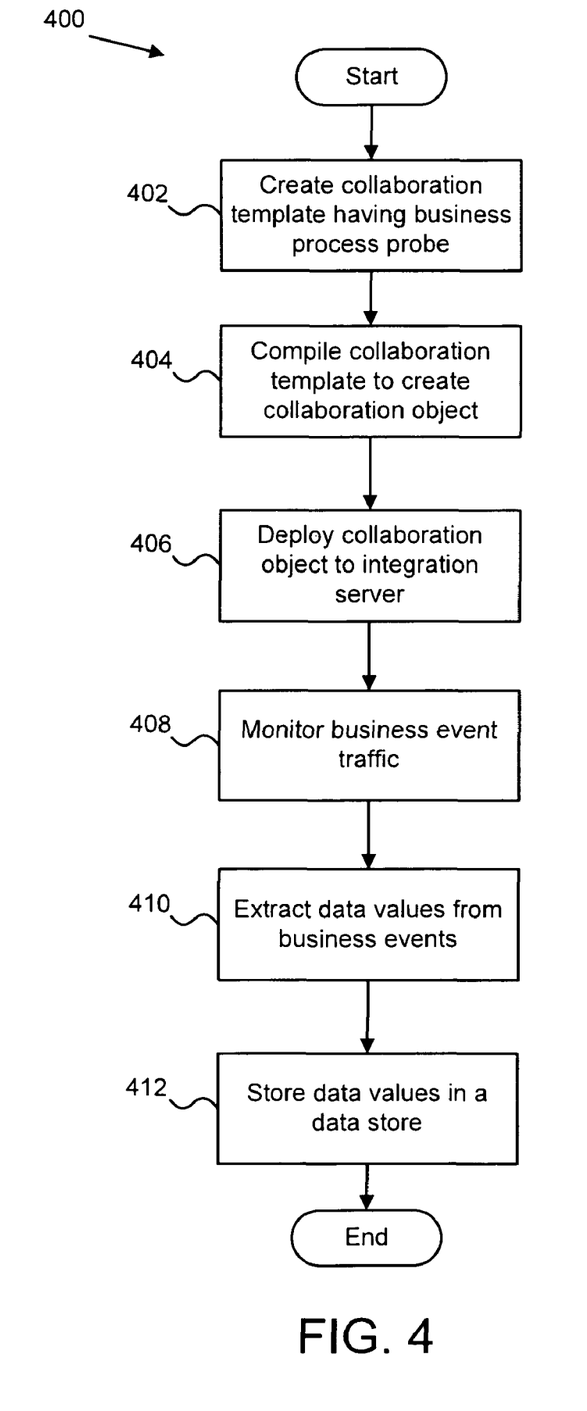
FIG. 4 is a schematic flow chart illustrating one embodiment of a method for non-intrusively monitoring business events.

FIG. 4 is a schematic flow chart illustrating one embodiment of a method 400 for non-intrusively monitoring business events. The method 400 begins and a collaboration template having a business process probe 120 is created 402 by the business process designer 108. The collaboration template typically includes a business scenario 300 and may include one or more probe points 302.

Next, the business process designer 108 compiles 404 the collaboration template to create a collaboration object 112. The collaboration object 112 is deployed 406 to an integration server 106. In one embodiment, business events 110 are passed to the collaboration object 112 and are processed by business process 118. Business probe 120 indicates to the business process monitoring utility 114 at which location in the business process 118 to monitor the business events 110, which business events 110 to include in the monitoring, and which data within the business events 110 should be extracted and stored in database 116.

Based on the business process probe 120, Monitor module 122 monitors 408 business event traffic. In response to the detection of a specified business event 110, extraction module 124 extracts 410 data from the business events 110 that corresponds to specified attributes 202. The business object attributes, in one embodiment, may comprise a subset of business object attributes associated with the business event 110. The extracted data is then stored 412 in a data store. The method 400 ends.

In another embodiment, the method 400 may further comprise presenting the data values for the business process probe to an operator of the middleware server. In yet another embodiment, the method 400 may further comprise filtering and querying the data stored in the data store according to user specified criteria as will be recognized by one skilled in the art. In another embodiment, the method 400 may include alerting a user in response to the stored data satisfying a predetermined condition.

Figure 5:
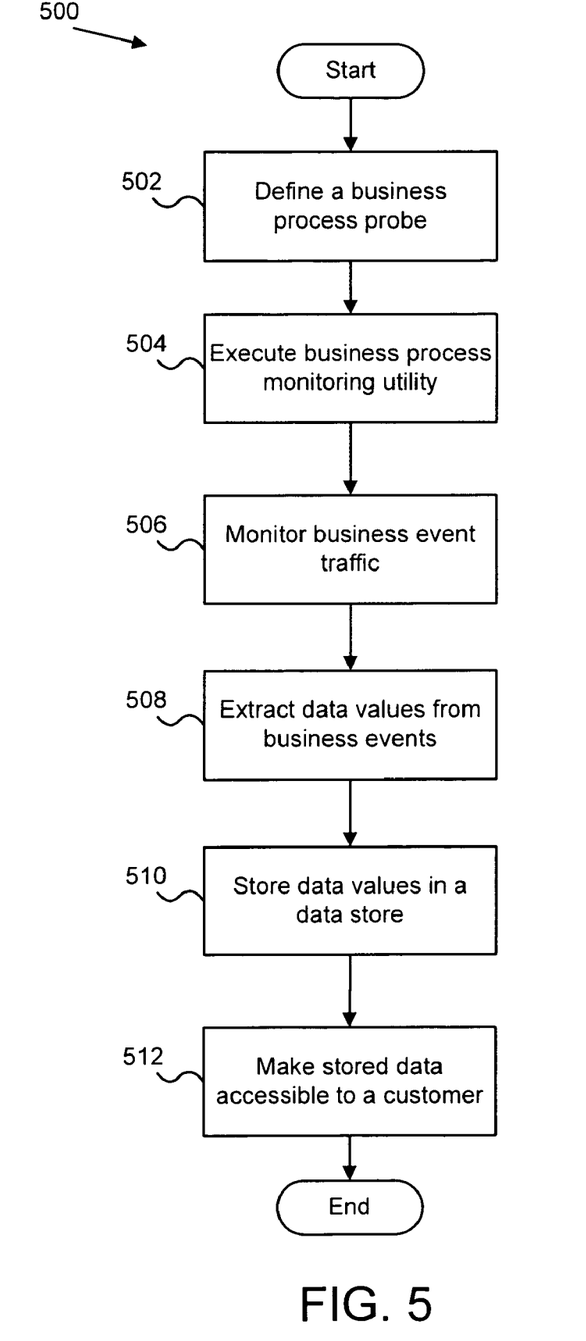
FIG. 5 is a schematic flow chart illustrating one embodiment of a method for utilizing a business process monitoring utility in accordance with the present invention.

FIG. 5 is a schematic flow chart illustrating one embodiment of a method 500 for utilizing a business process monitoring utility 114 in accordance with the present invention. The method 500 may substantially include the steps necessary to carry out the functions presented above with respect to the operation of the described embodiments.

The method 500 begins and a business process probe 120 is defined 502. The business process probe 120 may identify a probe point within a business scenario and may include a specified business event 110 and at least one business object attribute 202.

Next, a business process monitoring utility 114 is executed 504. The business process monitoring utility, in one embodiment, includes a monitor module 122, an extraction module 124, and a capture module as well as the other features substantially disclosed above. The monitor module 122 monitors 506 the business event traffic as indicated by the business process probe 120. The extraction module 508 extracts data values from the business events 110 that correspond to at least one business object attribute 202.

Next, the capture module 126 stores 510 the extracted data in a persistent data store 116. In various embodiments, the data in the data store 116 may be presented to a user, filtered, and/or queried. Finally, the data is made 512 accessible to a customer. The customer may use the data for various purposes such as troubleshooting their business integration system or monitoring the flow of data within their system. The method 500 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product for non-intrusively monitoring business events comprising non-transitory storage media storing a computer readable program, wherein the computer readable program when executed on a computer causes the computer to:
   determine an enterprise information system of a plurality of enterprise systems on which to place business process probes;
   monitor business event traffic on the determined enterprise information system based on at least two business process probes, wherein each business process probe indicating a business event to monitor, at least one business object attribute, and a location on the determined enterprise information system at which to monitor business event traffic, the business process defining inputs for the business event and coordinating a sequence of processing the business event, wherein at least two locations are utilized simultaneously and wherein the business event is used across multiple applications and triggers actions between the multiple applications, the business event comprising a business event identifier;
   detect the business event in the business event traffic that corresponds to the business event identifier for the at least two business process probes; and
   capture data values for the at least one business object attribute of the business process probe in a data store, the data values associated with the at least one business object attribute in a data store without altering the flow of the business process associated with the business event.

2. The computer program product of claim 1, wherein the computer readable program further causes the computer to present the data associated with the at least one business object attribute to a user.

3. The computer program product of claim 1, wherein the computer readable program further causes the computer to filter the data in the data store according user specified criteria.

4. The computer program product of claim 1, wherein the computer readable program further causes the computer to query the data stored in the data store according to user specified criteria.

5. The computer program product of claim 1, wherein the computer readable program further causes the computer to alert a user in response to the stored data satisfying a predetermined condition.

6. The computer program product of claim 1, wherein the computer readable program further causes the computer to generate a report comprising data stored in the data store.

7. The computer program product of claim 1, wherein the enterprise information system is an integration server.

8. The computer programmed product of claim 1, wherein the at least one business object attribute comprises a subset of business object attributes associated with the business event.

9. A computer program product for non-intrusively monitoring business events comprising non-transitory storage media storing a computer readable program, wherein the computer readable program when executed on a computer causes the computer to:
   create a collaboration template having a business process probe, the business process probe indicating a business event to monitor, at least one business object attribute, and a location at which to monitor business event traffic, the business process defining inputs for the business event and coordinating a sequence of processing the business event, wherein the business event is used across multiple applications and triggers actions between the multiple applications, the business event comprising a business event identifier;
   compile the collaboration template to create a collaboration object, the collaboration object comprising a machine executable software object, the collaboration object stored in computer readable memory;
   deploy the collaboration object, the collaboration object having an instance of the business process probe, the business process probe causing:
      a determination module to determine an enterprise information system of a plurality of enterprise systems on which to place business process probes;
      a monitor module to monitor business event traffic on the determined enterprise information system based on the business process probes, wherein at least two locations are utilized simultaneously;
      an extraction module to extract data values from the occurrence of the business event that corresponds to the business event identifier for the at least one business process probe, the data values associated with the at least one business object attribute identified by the business process probe;
      a capture module to store the data values in a persistent data store; and present the data values corresponding to the business process probes to an operator of the middleware server.

10. The computer program product of claim 9, further comprising filtering the data stored in the data store according to user specified criteria.

11. The computer program product of claim 9, further comprising querying the data stored in the data store according to user specified criteria.

12. The computer program product of claim 9, further comprising alerting a user in response the stored data satisfying a predetermined condition.

13. The computer program product of claim 9, further comprising generating a report comprising data stored in the data store.

14. The computer program product of claim 9, wherein the enterprise information system is an integration server.

15. The computer program product of claim 9, wherein the at least one business object attribute comprises a subset of business object attributes associated with the business event.

16. A method for non-intrusively monitoring business events, the method comprising:
    defining at least two business process probes, each business process probe indicating a probe point at a location in a sequence of processing operations within a single business process at which to monitor business event traffic, a business event to monitor, and at least one business object attribute, the business process defining inputs for the business event and coordinating a sequence of processing the business event, wherein the business event is used across multiple applications and triggers actions between the multiple applications, the business event comprising a business event identifier;

executing a business process monitoring utility comprising:

determining an enterprise information system of a plurality of enterprise systems on which to place business process probes;

a monitor module to monitor business event traffic on the determined enterprise information system for an occurrence of the business event that corresponds to the business event identifier for the at least two business process probes, wherein at least two probe points are utilized simultaneously;

an extraction module to extract data values from the occurrence of the business event at the probe points, the data values associated with the at least one business object attribute;

a capture module to store the data values in a persistent data store; and making the captured data accessible to a customer.

17. The method of claim 16, the business process monitoring utility presenting the data associated with the at least one business object attribute to a user.

18. The method of claim 16, the business process monitoring utility filtering the data in the data store according user specified criteria.

19. The method of claim 16, the business process monitoring utility querying the data stored in the data store according to user specified criteria.

20. The method of claim 16, the business process monitoring utility alerting a user in response to the stored data satisfying a predetermined condition.

21. The method of claim 16, the business process monitoring utility generating a report comprising data stored in the data store.

22. The method of claim 16, wherein the at least one business object attribute comprises a subset of business object attributes associated with the business event.

* * * * *